(12) United States Patent
Herman-Saffar et al.

(10) Patent No.: US 10,587,642 B1
(45) Date of Patent: Mar. 10, 2020

(54) AUTOMATED SECURITY INCIDENT RANKING

(71) Applicant: EMC IP Holding Company LLC, Hopkinton, MA (US)

(72) Inventors: Or Herman-Saffar, Beer-Sheva (IL); Amihai Savir, Sansana (IL); Stephen Todd, Shrewsbury, MA (US); Elik Levin, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 254 days.

(21) Appl. No.: 15/660,628

(22) Filed: Jul. 26, 2017

(51) Int. Cl.
*H04L 29/06* (2006.01)
*G06N 20/00* (2019.01)

(52) U.S. Cl.
CPC ......... *H04L 63/1433* (2013.01); *G06N 20/00* (2019.01); *H04L 63/1416* (2013.01)

(58) Field of Classification Search
CPC .. H04L 63/1433; H04L 63/1416; G06N 20/00
See application file for complete search history.

(56) References Cited

U.S. PATENT DOCUMENTS

| | | | | |
|---|---|---|---|---|
| 8,739,290 B1* | 5/2014 | Jamail | ................. | G06F 11/0709 726/25 |
| 9,628,506 B1* | 4/2017 | Han | ..................... | H04L 63/1441 |
| 2018/0139227 A1* | 5/2018 | Martin | ................. | H04L 63/1433 |
| 2018/0204154 A1* | 7/2018 | Howie | ............... | G06Q 10/0635 |
| 2018/0278634 A1* | 9/2018 | Adir | ..................... | H04L 63/1425 |
| 2019/0098025 A1* | 3/2019 | Lim | ........................ | G06N 20/00 |

OTHER PUBLICATIONS

J.E. Short et al., "What's Your Data Worth?" MITSloan Management Review, Spring 2017, pp. 17-19, vol. 58, No. 3.
"About STIX," https://oasis-open.github.io/cti-documentation/stix/about, Jul. 24, 2017, 3 pages.
"Assets Affected in an Incident," http://stixproject.github.io/documentation/idioms/affected-assets, Jul. 24, 2017, 2 pages.
U.S. Appl. No. 15/136,327 filed in the name of Stephen Todd et al. filed Apr. 22, 2016 and entitled "Calculating Data Value via Data Protection Analytics."
U.S. Appl. No. 15/660,599 filed in the name of or Herman-Saffar et al. filed Jul. 26, 2017 and entitled "Automated Security Feed Analysis for Threat Assessment."

* cited by examiner

*Primary Examiner* — Joseph P Hirl
*Assistant Examiner* — Ka Shan Choy
(74) *Attorney, Agent, or Firm* — Ryan, Mason & Lewis, LLP

(57) ABSTRACT

At least one security incident indicative of at least one security event that may impact or has impacted one or more assets associated with an organization is obtained. The at least one security incident is automatically ranked based on one or more of: (i) one or more rankings associated with one or more security incidents that precede the at least one security incident in time; and (ii) one or more values attributed to the one or more assets of the organization. The ranking of the at least one security incident is presented to an entity to make an assessment of the security event.

20 Claims, 9 Drawing Sheets

| INCIDENT | |
|---|---|
| ID | IDENTIFIER FOR THE INCIDENT |
| TITLE | TITLE FOR THE INCIDENT |
| TIME | TIME OF INCIDENT DISCOVERY |
| DESCRIPTION | DESCRIPTION FOR THE INCIDENT |
| RESPONDER | INFORMATION ABOUT THE RESPONDER FOR THE INCIDENT |
| AFFECTED ASSETS | CHARACTERIZE THE PARTICULAR ASSETS AFFECTED DURING THE INCIDENT |
| IMPACT ASSESSMENT | SUMMARY ASSESSMENT OF IMPACT FOR THE INCIDENT |
| INDICATORS | CHARACTERIZE THREAT INDICATORS RELATED TO THE INCIDENT |
| OBSERVABLES | CHARACTERIZE CYBER OBSERVABLES RELATED TO THE INCIDENT |
| TTPs | TACTICS, TECHNIQUES AND PROCEDURES RELATED TO THE INCIDENT |
| RELATED INCIDENTS | IDENTIFIES OTHER INCIDENTS RELATED TO THE CURRENT INCIDENT |
| COA | COURSE OF ACTION FOR THE INCIDENT |
| HISTORY | LOG OF EVENTS OR ACTIONS TAKEN DURING HANDLING THE INCIDENT |

```
"VmList":[
 { },
 { },
 { },
 {
  "Ip":"172.31.51.110",
  "ConnectedStorage":{ },
  "MemoryAllocated":0,
  "ProcessorAllocated":0,
  "Ports":[ ],
  "RunningApplications":[ ],
  "InstalledApplications":[
   {
    "Name":Google Chrome",
    "Version":"55.0.2883.87",
    "Location":"C:\\Program Files (x86)\\Google\\Chrome\\Application"
   },
   {
    "Name":"Nmap 6.47",
    "Version":null,
    "Location":null
   },
   {
    "Name":"WinPcap 4.1.3",
    "Version":"4.1.0.2980",
    "Location":null
   },
   {
```

700

AUTOMATED SECURITY INCIDENT RANKING

FIELD

The field relates generally to information processing systems, and more particularly to cyber-security incident management techniques for use with such information processing systems.

BACKGROUND

A cyber-security incident is a violation or imminent threat of violation of security policies associated with the infrastructure of an organization. Such infrastructure may include, but is not limited to, information processing systems that the organization maintains or otherwise relies upon. Organizational attacks frequently compromise personal and business data, and it is critical to respond quickly and effectively when security breaches occur. Effective incident management helps personnel to minimize loss or theft of information and disruption of services caused by such incidents. However, nowadays, the incident management process is done manually and is highly dependent on a security incident response team and its expertise.

SUMMARY

Embodiments of the invention provide cyber-security incident management techniques using automated security incident analysis.

For example, in one embodiment, an automated security incident analysis method comprises the following steps. At least one security incident indicative of at least one security event that may impact or has impacted one or more assets associated with an organization is obtained. The at least one security incident is automatically ranked based on one or more of: (i) one or more rankings associated with one or more security incidents that precede the at least one security incident in time; and (ii) one or more values attributed to the one or more assets of the organization. The ranking of the at least one security incident is presented to an entity to make an assessment of the security event.

Additional embodiments perform one or more of the above steps in accordance with an apparatus or system comprising a processor and memory, and in accordance with an article of manufacture or computer program product.

Advantageously, a cyber-security threat assessment process according to illustrative embodiments automatically indicates the ranking of a current security incident based on the sensitivity of the involved systems and the importance of former security feeds.

These and other features and advantages of the invention will become more readily apparent from the accompanying drawings and the following detailed description.

BRIEF DESCRIPTION OF THE DRAWINGS

FIG. 4 illustrates an example of security incident characteristics utilized by a system and process for automated security incident analysis, according to an illustrative embodiment.

FIG. 6 illustrates an example of a file representation of organizational information utilized by a system and process for automated security incident analysis, according to an illustrative embodiment.

DETAILED DESCRIPTION

Figure 1:
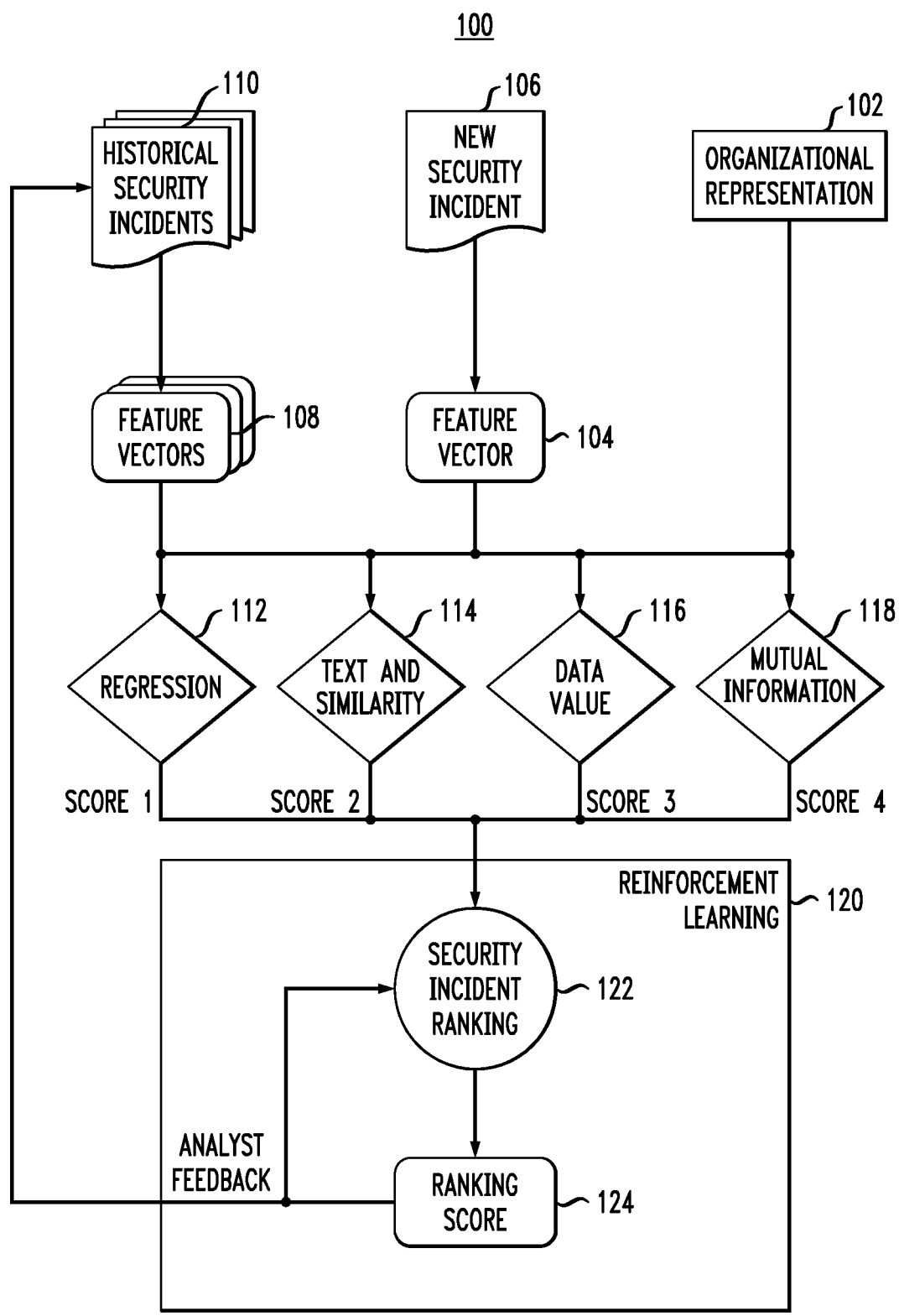
FIG. 1 illustrates a system and process for automated security incident analysis, according to an illustrative embodiment.

Illustrative embodiments will be described herein with reference to exemplary information processing systems and associated host devices, storage devices and other processing devices. It is to be appreciated, however, that embodiments are not restricted to use with the particular illustrative system and device configurations shown.

As mentioned above in the background, an organization exposed to cyber-security incidents is at risk for loss of data and disruption of services, both which can have a significant financial impact on the organization. The term "organization" as used herein is intended to be broadly construed, and may comprise, for example, a business or any other entity, group, person, enterprise, or multiples thereof. The incident management process put in place by an organization is critical to minimizing these and other losses.

Organizations benefit from effective incident management processes. It is realized herein that one benefit of effective organizational incident management is the ability to use information gained during incident handling to better prepare for handling future incidents and to provide stronger protection for systems and data of an organization's infrastructure.

One phase in the incident management process is incident prioritization, i.e., determining which incident(s) among a plurality of incidents should be addressed first. Prioritization of the handling of the incident is perhaps the most critical decision point in the incident management process. Incidents should not necessarily be handled on a first-come, first-served basis due to resource limitations. Instead, it is realized herein that incident handling should be prioritized based on the relevant factors, such as functional impact, information impact, business impact and recoverability from the incident.

It is further realized herein that the value of the data assets across the organization is important for the security incident prioritization process. Security incidents involving high-value data assets should be prioritized so that such incidents could be handled first in order to protect the related assets and return affected systems to an operationally ready state as fast as possible.

Illustrative embodiments, as will be explained in detail below, provide a security analyst of an organization with a prioritized list of the current security incidents occurring in the organization in order to make the incident management process more efficient and simple.

Before describing illustrative embodiments in detail, various technical and conceptual problems with the existing manual incident management performed by a security analyst are described below.

As mentioned above, the existing approach applied in the field is performed by individuals, i.e., security analysts. The security analyst receives information about security incidents from sources such as, but not limited to, security information products and/or services that the organization has put in place to attempt to monitor infrastructure breaches and violations of other security policies. These products are designed to attempt to help the security analysts with security incident management. However, even with these products, the ever-increasing number of security incidents that occur in the form of new security attacks still makes the tasks of prioritization and analysis very difficult for the security analyst to perform manually. This results in inaccurate prioritization of security incidents which can lead to undesirable consequences (e.g., loss of data, loss of revenue, loss of reputation, liability, etc.) for the organization.

Since analysis of security incidents and the evaluation of their impact on the organization is done by individuals in the existing approach, it is very difficult to consider the vulnerability of the organizational assets and to carefully protect the high-value data assets, especially when it comes to large organizations.

Furthermore, analyst perspective may influence the analysis process and decision making. Different analysts can make different security decisions based on their knowledge and experience and thereby influence the organization vulnerability differently. An experienced security analyst could perform a correct incident analysis, while a new security analyst could cause wrong decisions to be made based on his faulty analysis.

Several different security incidents can be related to the same subject. Two or more related incidents are likely to occur separately and not in the same time period. The security analyst's ability to recognize the incident relevance for an existing subject is low. This prevents the analyst from seeing the complete picture of the security incident.

It is further realized herein that historical security incidents and their remediation process could help the security analyst prioritize the new security incident better and teach about its severity. However, the ever-increasing number of security incidents that occur in the form of new security attacks prevents the security analyst from being able to consider relevant past incidents when evaluating a new incident.

The security analyst should take into account the organization when analyzing security incidents. In the existing approach, there is no one way to represent an organization and incident analysis is done only based on the analyst's familiarity with the organization.

Different categories of security incidents require different response strategies. The common attack categories that define an incident include, but are not limited to: external media, attrition, web, email, impersonation, improper usage and loss or theft of equipment. However, there are security attacks that do not fit into any of these categories. This variation leads to difficulty in the incident management. Even an experienced analyst can come across new types of security incidents and will need to handle them in a new way.

Illustrative embodiments overcome the above and other drawbacks of the existing manual security incident analysis approach by providing an automated system and methods for ranking security incidents from the most severe incidents that require immediate remediation to the least severe security incidents that do not require immediate remediation. The ranking is performed based on the sensitivity of the involved systems and based on former similar security incident severity. This automated and comprehensive approach has many advantages. Examples of such advantages include, but are not limited to:

(i) The analysis process is general and allows for easy integration of new security incidents.

(ii) The value of the data assets across the organization is considered when creating a ranked list of security incidents for the analyst.

(iii) The organization representation is very informative and provides unambiguous representation that allows accurate security incident ranking.

(iv) Results are easily interpretable and provide straightforward security incident ranking for the analysts.

In one illustrative embodiment, the incident management process involves several consecutive stages. These stages include: pulling new security incidents, cleaning and parsing the data, representing the organization (including the data's value to the organization), developing a ranking model to determine a ranking score for each security incident, based on importance of organizational assets involved and historical incident ranking scores.

More particularly, as will be described below, illustrative embodiments provide an integrated machine learning ranking model that produces a ranked list of current security incidents. The model is trained based on historical security incidents and their ranking scores as well as on a specific organizational representation. When one or more new incidents occur, the model creates a ranked list of the incidents and produces a ranking score for each one of the incidents.

In one or more illustrative embodiments, analysis and integration of related security incidents is performed using correlation measures for the incident structured features and using similarity measures such as, but not limited to, term frequency-inverse document frequency (TF-IDF) for the textual incident information.

In order to improve the performance of the machine learning ranking model, in one or more illustrative embodiments, the system considers the security analyst feedback. After the analyst uses the ranked list and handles each incident, the analyst gives feedback about the ranking score of each incident. Accordingly, such feedback improves the performance of the incident ranking model.

FIG. 1 illustrates a system and process 100 for automated security incident analysis, according to an illustrative embodiment. As shown, organizational representation 102, a feature vector 104 extracted from new security incident 106, and one or more feature vectors 108 extracted from one or more historical security incidents 110 are used to compute a set of scores comprising a regression score 112 (score 1), a text and similarity score 114 (score 2), a data value score 116 (score 3) and a mutual information score 118 (score 4). The set of scores is fed as input to a reinforcement learning module 120. The score computations 112, 114, 116 and 118 are integrated to form the ranking model which is applied to the new security incident 106 in security incident ranking module 122 which yields ranking score 124 for the new security incident 106. The reinforcement learning module 120 takes into account analyst feedback to improve the incident ranking results. It is to be understood that the historical security incidents 110 precede the new (current) security incident 106 in time.

In one or more illustrative embodiments, the security incident features (of the corresponding feature vectors 104 and 108) are both structured and textual. The structured features can be, for example, binary features such as indicators and observables or categorical features such as are illustrated in FIG. 4 and otherwise described herein. The textual features can be, for example, the title, description and any other textual information describing the incident.

In an illustrative embodiment, the ranking of new security incidents (e.g., 106) is calculated based on the two feature types (structured and textual) as will now be explained with respect to scores 112, 114, 116 and 118. Note that scores 112 and 114 are based on security incidents, while scores 116 and 118 are based on organizational representation.

Score 112 is computed based on structured features. More specifically, a machine learning ranking model (e.g., a regression model) is at least partially trained based on the structured features of historical incidents 110 and their ranking scores. When new incident 106 occurs, its ranking score is calculated using this model.

Score 114 is computed based on textual features. More specifically, one or more text analytics techniques (e.g., TF-IDF, bag of words, etc.) are used in order to create feature vectors from the textual information of each incident. Using this vector and using similarity measures (e.g., Pearson correlation, cosine similarity, etc.), the system checks the similarity between current incident 106 and every historical incident 110. In an illustrative embodiment, the most similar incidents from the past and their ranking scores are multiplied to obtain score 114 as follows:

$$\text{score } 2 = \frac{\sum_i \text{similarity}_i \cdot \text{ranking}_i}{\sum_i \text{similarity}_i}$$

The most similar incidents are also used for creating a broader view of the current incident 106.

Score 116 is computed based on structured features of data values associated with organizational assets Relationships between organizational assets are also considered when a highly important asset is connected to the asset affected by the incident. Data valuation will be further explained below in the context of FIG. 3.

Score 118 is computed based on textual features such as data describing software installed across the organization and data specifying the particular versions of the software that are installed. This score represents the number of overlapping phrases in the incident textual information and organization. Accordingly, this score expresses how extensive the incident is regarding the specific organization.

Figure 2:
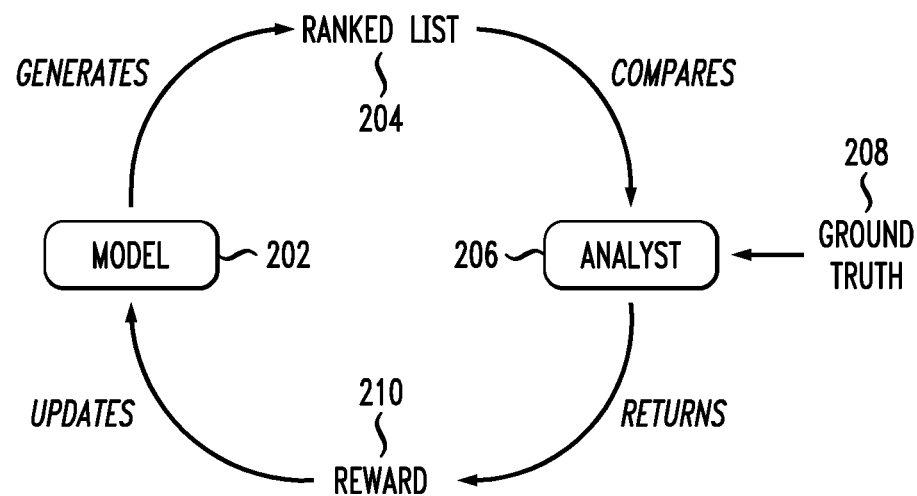
FIG. 2 illustrates an example of reinforcement learning used in automated security incident analysis, according to an illustrative embodiment.

The above scores are integrated to one ranking model that produces one ranking score for each new incident. The model is also trained using the security analyst feedback and reinforcement learning as illustrated in FIG. 2.

Initially, as shown in reinforcement learning algorithm 200, the ranking model 202 generate its own ranked list 204. Then, the security analyst 206 compares the generated ranked list against his "Ground truth" 208 which relies on the analyst's expertise. This feedback then indicates to the model 202 how "good" the generated list was. If the score is high, then the model 202 can update itself to make sure such rankings are more likely to appear in the future. Otherwise, if the score is low, the model 202 gets penalized and changes its generation procedure to prevent similar rankings. These rewards 210 are considered when updating weight values given to scores 112, 114, 116 and 118 of the machine learning model.

Returning to FIG. 1, by way of example only, organizational representation 102 may further comprise information such as, but not limited to: software\hardware inventory, asset user information, asset locations, value of each data asset across the organization, and relationships between organizational assets. Organizational representation 102 will be described in further illustrative detail below.

Furthermore, security incident processing (e.g., feature vector extraction 104, 108) according to illustrative embodiments may comprise: extracting relevant fields from each security incident; and enriching the information about the security incident using previous related incidents.

Automatic security incident ranking in module 122 is derived from multiple criteria, for example, in one illustrative embodiment:

(i) Value of data assets involved with the security incident.

(ii) Organizational importance of assets involved with the security incident.

(iii) Communication between assets across the organization, in case that one of the connected assets is discussed in the security incident.

(iv) Previous security incidents and their rankings.

Further illustrative details of the main stages of process 100 as well as other functionalities will now be described in the context of FIGS. 3-11.

Prioritize High-Value Data Assets

One main advantage of the automated security incident analysis approach according to illustrative embodiments is the use of a data valuation metric for each organizational asset. More specifically, a security incident related to a high-value data asset within the organization is placed in the top of the ranked security incident list. Security incidents that deal with relatively high-value data assets receive high ranking scores. The availability of data value scores allows to increase the confidence in the incident score and to place the security incident higher in the ranked list.

Recent research into the economic value or business priority of data has resulted in different approaches for measuring and storing specific numeric metadata (e.g., either currency amounts or relative rankings) alongside of corporate data assets. Data valuation metadata can then be used for a variety of business purposes (e.g., beginning to treat data as a balance sheet asset).

Note that any number of valuation scores may be assigned to a data set, such as an economic cost (e.g. a dollar or euro amount), the intrinsic value (IVI), the business value (BVI), etc. Additional valuation metadata can result in richer and more accurate security threat prioritization.

Figure 3:
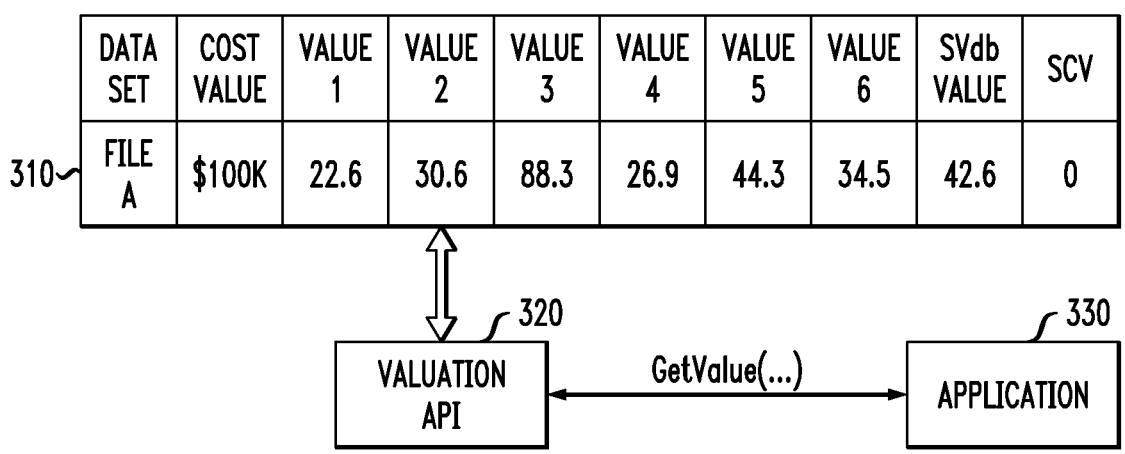
FIG. 3 illustrates an example of a data valuation table utilized by a system and process for automated security incident analysis, according to an illustrative embodiment.
Figure 7:
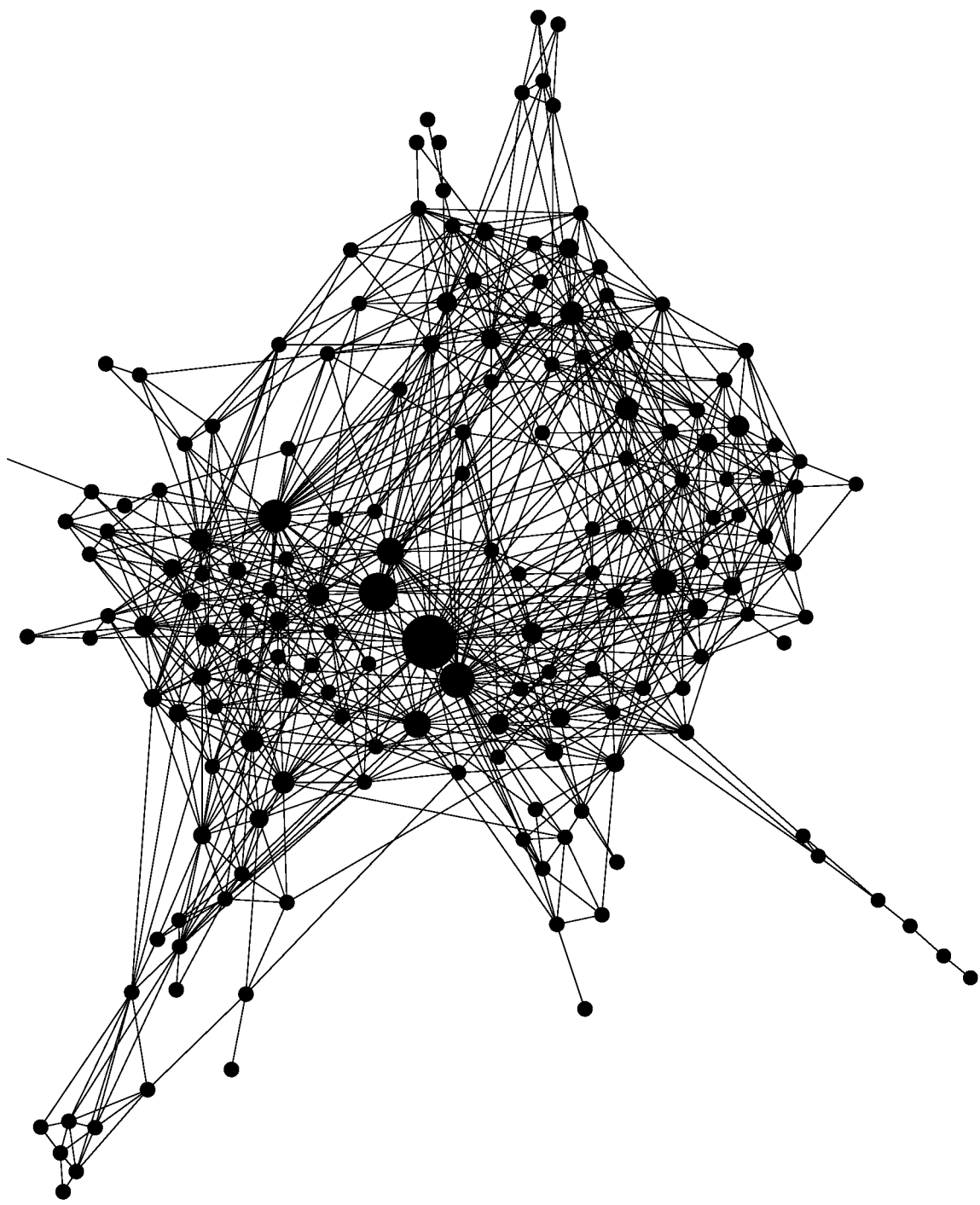
FIG. 7 illustrates an example of a visualization of connections between organizational assets utilized by a system and process for automated security incident analysis, according to an illustrative embodiment.

As illustrated in methodology 300 in FIG. 3, a valuation table 310 represents a table stored for file A (i.e., an organizational asset). Table 310 shows illustrative values computed for a set of data valuation algorithms (i.e., value 1 is an output value that corresponds to a first valuation algorithm, value 2 is an output value that corresponds to a second valuation algorithm, and so on). Also shown is a cost value which represents a cost to the organization associated with obtaining file A (e.g., purchase cost). Note that one or more of the valuation algorithms can implement valuation criteria that are standard for and/or required by a specific industry. Advantageously, table 310 also includes an SVdb (streaming valuation database) value that corresponds to a valuation algorithm executed on file A at the time of ingest of file A to the information processing system of the organization. Table 310 may also include an SCV (streaming correlation valuation) value which indicates a correlation between file A and some other organizational asset (e.g., file C). Thus, if the SCV value is zero (as illustratively shown), this means that the content of file C has no correlation with respect to file A. This correlation information can also be obtained from or supplemented by an organizational information network such as shown in FIG. 7.

As further shown, a valuation application programming interface (API) 320 can fetch a value for file A based on a query from an application 330. In illustrative embodiments, the application 330 may be process 100 (or one or more of its components) which fetches or otherwise obtains one or more data values for file A from table 310 for use in security incident ranking operations.

By way of example only, valuation algorithms used to generate one or more of the data values illustrated in table 310 may comprise, but are not limited to:

unstructured tokenization algorithms (UTA) described in U.S. patent application Ser. No. 14/863,783, filed Sep. 24, 2015, entitled "Unstructured Data Valuation," the disclosure of which is incorporated herein in its entirety;

application development and deployment velocity valuation algorithms described in U.S. patent application Ser. No. 14/998,112, filed Dec. 24, 2015, entitled "Data Valuation Based on Development and Deployment Velocity," the disclosure of which is incorporated herein in its entirety;

data ingest valuation algorithms described in U.S. patent application Ser. No. 15/135,790, filed Apr. 22, 2016, entitled "Data Valuation at Content Ingest," the disclosure of which is incorporated herein in its entirety;

data value tree generation techniques described in U.S. patent application Ser. No. 15/135,817, filed Apr. 22, 2016, entitled "Data Value Structures," the disclosure of which is incorporated herein in its entirety; and valuation algorithms based on analysis of a backup and recovery ecosystem described in U.S. patent application Ser. No. 15/136,327, filed Apr. 22, 2016, entitled "Calculating Data Value via Data Protection Analytics," the disclosure of which is incorporated herein in its entirety.

It is to be appreciated that the above valuation processes are intended to be examples only, and thus other valuation algorithms and techniques can be used in alternative embodiments. One additional non-limiting example includes a business value of information metric which takes into account the relevance of one or more business units of an organization that uses a given data asset.

It is also to be appreciated that while such valuation processes may be applied to data sets associated with the organization, the valuation techniques can also be applied to other assets related to data of the organization including, but not limited to, applications, services, etc.

Accordingly, the data values are fed into the one or more automated incident analysis algorithms for prioritizing security incidents. For example, as a new security incident 106 flows into process 100, the following steps are executed to calculate value:

(i) Data assets relevant to the security incident are discovered (e.g., this security incident is relevant to "File A").

(ii) The value of relevant data assets is fetched from the valuation ecosystem (e.g., valuation table 310) and fed into the security algorithm.

(iii) If the valuation is "unknown" or "uninitialized," a number of different approaches can be used, by way of example: (a) data value is calculated on the fly (in real time or near real time) by one or more of the valuation algorithms described above or by some other system or method; (b) data value is calculated based on historical related security incidents; or (c) data value is defaulted to "critical" to gain the attention of the security analyst, and motivate the organization to address unvalued assets.

Security Incident Automatic Investigation

Since the existing incident management approach is manual, the process is biased and dependent on the analyst that receives the incidents and the analyst's expertise. One or more illustrative embodiments use only the incident characteristics and take into account historical security incidents to provide a holistic and reliable view of the current incidents. In one example, each security incident is analyzed to extract its characteristics using a Structured Threat Information eXpression (STIX) format. Table 400 in FIG. 4 illustrates important incident categories (left hand column) and their characteristics (right hand column) that are extracted and used for ranking operations as described herein.

Each category has internal schema which specifies it in detail. For example, the "impact assessment" feature contains a written summary as well as a severity score determined by the responder analyst. The "affected assets" feature contains a list of the affected assets and their types, values of data, etc.

Figure 9:
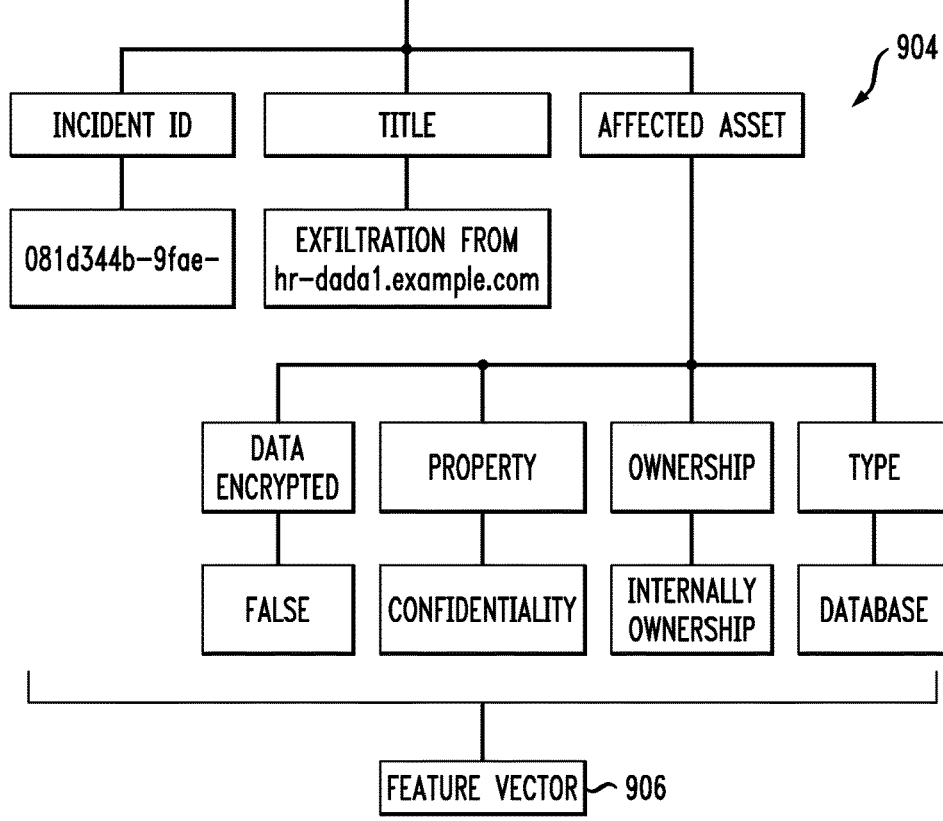
FIG. 9 illustrates an example of a security incident and its features, according to an illustrative embodiment.

An example of a security incident and its possible categorical features is described below in FIG. 9.

Related Security Incident Integration

Related security incidents can arrive in different time periods. In the existing approach, all the incoming incidents are divided between the analysts. Hence, the analysts can mistakenly analyze related incidents and not be able to infer extra knowledge about the whole incident. The integration of the related incidents is extremely important in order to be able to provide the analyst an overall representation of the specific security incident. Illustrative embodiments take into consideration all the related security incidents and thus present the analyst with a complete picture of the current incident.

Historical Security Incident Consideration

Illustrative embodiments employ consideration of historical security incidents, their remediation and their ranking scores, which leads to accurate ranking of a new security incident. After handling security incidents, the analyst quantifies the severity of the incidents. As a new security incident flows through the system and process 100 of FIG. 1, it receives a ranking score using its characteristics and the value of data assets involved. If the valuation is "unknown," historical related incidents are considered to quantify the value of data the incident may affect based on the historical related incidents' severity defined by the analyst or based on the value of data involved with the historical related incidents.

Organizational Representation

Figure 5:
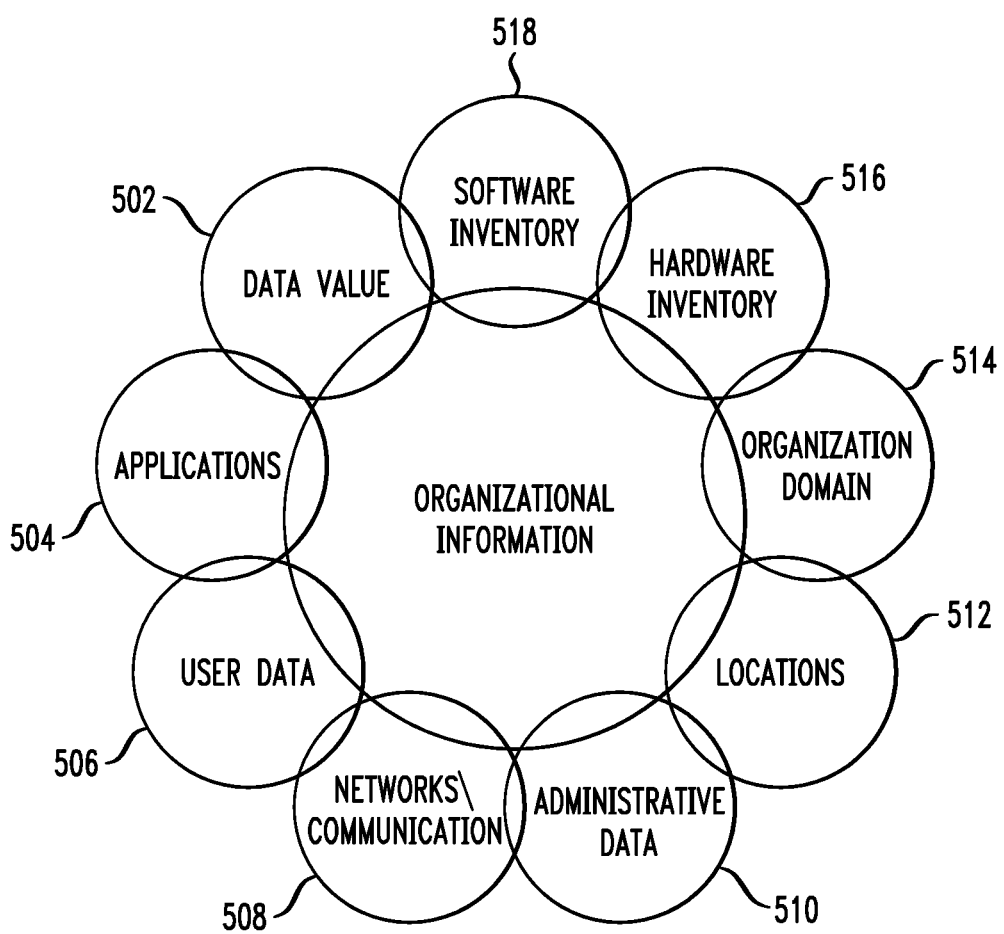
FIG. 5 illustrates an example of a graphical representation of organizational information utilized by a system and process for automated security incident analysis, according to an illustrative embodiment.

Illustrative embodiments realize that in order to determine the ranking of each security incident and its importance to specific organizational assets, a complete (or as close to complete as possible) representation of the organization should be considered. FIG. 5 represents the organizational information taken into account (as organizational representation 102) to determine the ranking score of the security incident. To obtain a complete representation, each asset across the organization should be represented by this information.

Thus, as shown, organizational information 500 may comprise, but not be limited to, data value 502, applications 504, user data 506, networks/communication 508, administrative data 510, locations 512, organization domain 514, hardware inventory 516, and software inventory 518.

An example of organizational information (considered as another example of organizational representation 102) in the form of a JavaScript Object Notation (JSON) file 600 is shown in FIG. 6. In an illustrative embodiment, file 600 contains all the information 500 mentioned above for each asset in the organization.

In an illustrative embodiment, relationships between the organizational assets is also taken into consideration when the security ranking score is calculated. FIG. 7 provides a visualization 700 of the connections between the organizational assets in the form of an organizational network (another example of organizational representation 102). Each circle represents a specific asset and the arrows represent the data flow between the assets. The size of circles indicates the value of data stored on the asset.

Security incidents are prioritized in case that they involve information that relates to sensitive assets. In an illustrative embodiment, the sensitivity of an organizational asset may be determined based on the following measures: (i) the value of data stored on the asset; (ii) the amount of data flow through the asset; and (iii) the connectivity of the asset to other assets.

Relationships Between Organizational Assets

Illustrative embodiments consider the relationships between organizational assets. An asset that communicates with numerous assets can affect the other assets in case of a security incident. Such asset will therefore receive high scoring, to avoid situation in which a large part of the organization is paralyzed when a security incident occurs on one asset. In addition, when a security incident occurs on one asset, the connected assets will also be examined to ensure they are not affected by the security incident. In one example, the above-mentioned SCV valuation technique (e.g., SCV value in table 310) can be utilized to quantify and dynamically track the relationship between assets in the organization. Alternatively, an information network such as network 700 (FIG. 7) can be used.

Automatic Security Incident Ranking

One main benefit of the automated security incident analysis according to illustrative embodiments is that security incident relevance ranking is performed automatically. The security analyst will not have to decide which security incident should be treated first. Rather, in illustrative embodiments, he will receive a ranked list of security incidents, e.g., from the most significant security incident (e.g., highest importance to the organization requiring immediate remediation) to the least significant security incident (e.g., lowest importance to the organization and not requiring immediate remediation).

Figure 8:
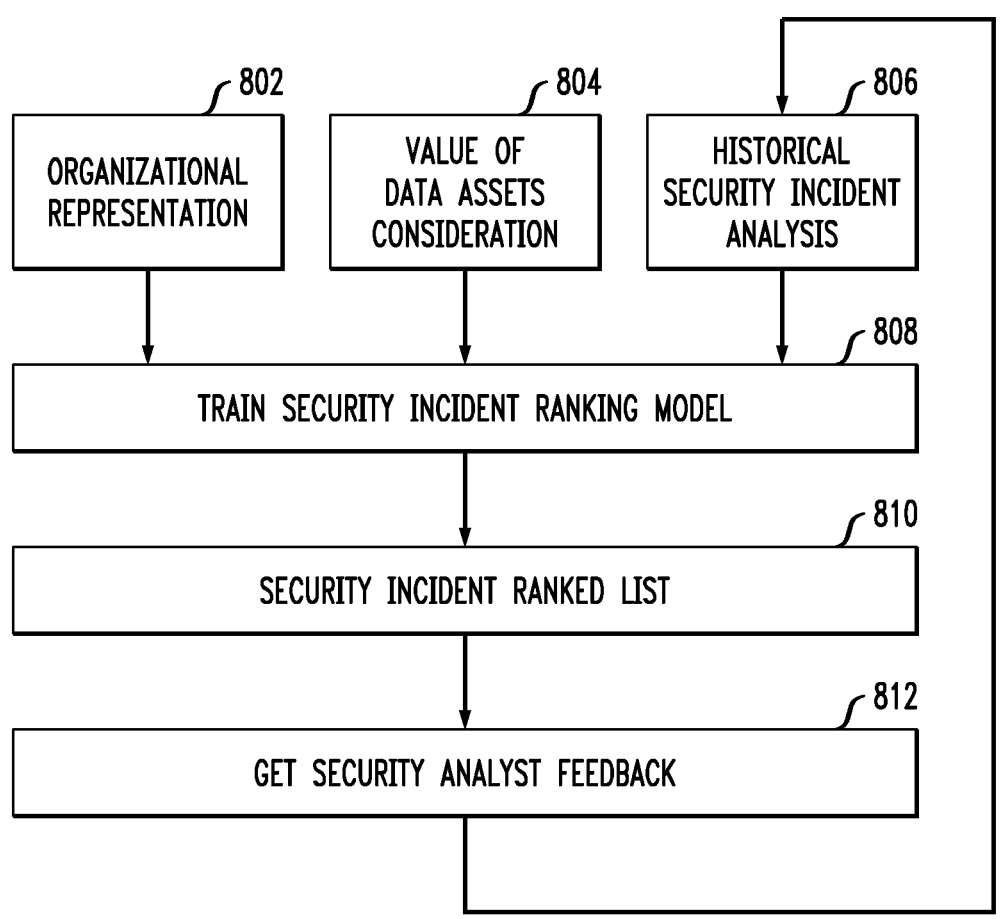
FIG. 8 illustrates a security incident ranking process for automated security incident analysis, according to an illustrative embodiment.

Once the organizational and security incidents representations are prepared, the security incident ranking algorithm is applied to determine the incident ranking score which provides the incident remediation importance to the organization. FIG. 8 depicts security incident ranking algorithm 800.

As shown, organizational representation 802, data asset values 804, and historical security incident analysis 806 is used to train the security incident ranking model in step 808. More specifically, the training of the ranking model is based on the data value of the involved assets, as well as historical security incidents and their rankings. The ranking model is trained based on historical security incidents to get a ranking score for each new security incident. Then, the value of the data assets involved is taken into account and increases the ranking score in the case of a high-value data asset. Note that data valuation can be obtained as illustratively described above in the context of FIG. 3.

The combination of these factors leads to an accurate ranking (ranked list 810) for security incidents. After the security incident ranking score is calculated, feedback from a security analyst is provided (812) in order to confirm the ranking and improve the ranking model. A repository of ranked security incidents is saved for reuse, e.g., for training and improvement of the ranking model.

As explained above, a security incident can contain information about the set of organizational assets that were affected in the course of that incident. For example, this information allows understanding of the impact of a particular incident on the information technology (IT) assets that it affected and the business functions that are supported by that IT assets. In accordance with one or more illustrative embodiments, this information is taken into account to calculate the ranking score of the security incident. One non-limiting example of a specific format for information about a given security incident is the above-mentioned STIX format.

When a new security incident occurs, it is first analyzed to extract its important information and create a feature vector that represents the incident. Feature vector extraction 900 is illustrated in FIG. 9. As shown, a new security incident is represented by information table 902. Features 904 are extracted from the information table 902. The features 904 are represented by feature vector 906 used in the ranking process.

Figure 10:
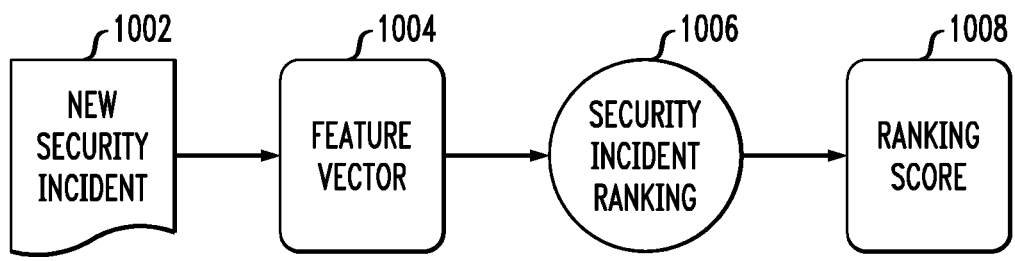
FIG. 10 illustrates an automated ranking process for a given security incident, according to an illustrative embodiment.

As illustrated in an overview in FIG. 10, process 1000 receives as input a new security incident 1002. A feature vector 1004 representing the new security incident 1002 is fed into a security incident ranking algorithm 1006 to determine a ranking score 1008 for the new security incident 1002. This ranking gives the analyst an indication of incident prioritization, allowing an entity (e.g., a security analyst or a system) to take any necessary action with regard to the new security incident.

At least portions of the automated system and methods for ranking security incidents shown in FIGS. 1-10 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the automated system and method for ranking security incidents shown in FIGS. 1-10 may each run on a computer, server, storage device or other processing platform element. A given such element may be viewed as an example of what is more generally referred to herein as a "processing device." An example of such a processing platform is processing platform 1100 shown in FIG. 11.

The processing platform 1100 in this embodiment comprises a plurality of processing devices, denoted 1102-1, 1102-2, 1102-3, . . . 1102-N, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 11:
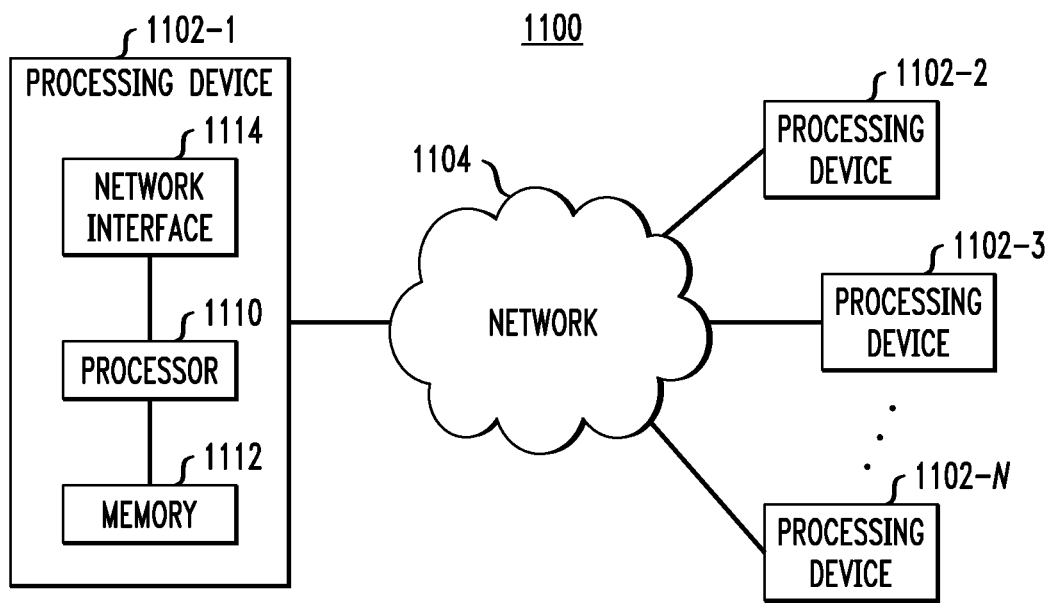
FIG. 11 illustrates a processing platform used to implement systems and methods for automatically analyzing security incidents, according to an illustrative embodiment.

Also included in the processing device 1102-1 of the example embodiment of FIG. 11 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system and method for ranking security incidents, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system and methods described herein. Such components can communicate with other elements of the system over any type of network or other communication media.

As indicated previously, in some embodiments, components of the automated system and method for ranking security incidents as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of security incidents. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
obtaining at least one security incident indicative of at least one security event that may impact or has impacted one or more assets associated with an organization;
automatically ranking the at least one security incident based on one or more of: (i) one or more rankings associated with one or more security incidents that precede the at least one security incident in time; and (ii) one or more values attributed to the one or more assets of the organization; and
presenting the ranking of the at least one security incident to an entity to make an assessment of the security event;
wherein the step of automatically ranking the at least one security incident further comprises computing a set of scores used to train a ranking model;
wherein the set of scores used to train the ranking model comprises:
a regression score computed based on structured features associated with the one or more security incidents that precede the at least one security incident in time;
a similarity score computed based on textual features associated with the at least one security incident and the one or more security incidents that precede the at least one security incident in time;
a data valuation score computed based on structured features associated with the one or more assets of the organization; and
a mutual information score computed based on textual features associated with the at least one security incident and with the one or more assets of the organization; and
wherein the above steps are executed by at least one processing device comprising a processor operatively coupled to a memory.

2. The method of claim 1, further comprising receiving feedback from the entity about the ranking of the at least one security incident.

3. The method of claim 2, further comprising adjusting the ranking of the at least one security incident based on the feedback from the entity.

4. The method of claim 1, wherein the step of automatically ranking the at least one security incident further comprises applying a reinforcement learning algorithm on a ranking model used to generate the ranking of the at least one security incident.

5. The method of claim 4, wherein the reinforcement learning algorithm improves the ranking model based on feedback from the entity.

6. The method of claim 1, wherein the step of automatically ranking the at least one security incident further comprises determining relevance based on a comparison between a representation of information of the one or more assets of the organization and the at least one security incident.

7. The method of claim 6, wherein the representation of information of the one or more assets of the organization comprises an organizational network that represents value of each asset of the organization and relationships between assets.

8. The method of claim 6, wherein the representation of information of the one or more assets of the organization comprises one or more information files that respectively correspond to the one or more assets of the organization.

9. The method of claim 1, wherein the step of automatically ranking the at least one security incident further comprises computing a ranking score based on one or more security incidents that preceded the at least one security incident in time and the one or more values attributed to the one or more assets of the organization.

10. The method of claim 1, wherein the one or more values attributed to the one or more assets of the organization are computed by one or more valuation algorithms.

11. The method of claim 10, wherein at least one of the valuation algorithms computes correlation between two or more of the assets of the organization.

12. The method of claim 1, wherein at least a second security incident indicative of a second security event that may impact or has impacted the one or more assets associated with the organization is obtained, and the automated ranking step is performed on the second security incident.

13. The method of claim 12, wherein the presenting step further comprises presenting the rankings of the at least one security incident and the second security incident in a ranked list to the entity to make an assessment of the security events.

14. A system comprising:
at least one processor, coupled to a memory, and configured to:
obtain at least one security incident indicative of at least one security event that may impact or has impacted one or more assets associated with an organization;
automatically rank the at least one security incident based on one or more of: (i) one or more rankings associated with one or more security incidents that precede the at least one security incident in time; and (ii) one or more values attributed to the one or more assets of the organization; and
present the ranking of the at least one security incident to an entity to make an assessment of the security event; and
wherein automatically ranking the at least one security incident further comprises computing a set of scores used to train a ranking model;
wherein the set of scores used to train the ranking model comprises:
a regression score computed based on structured features associated with the one or more security incidents that precede the at least one security incident in time;
a similarity score computed based on textual features associated with the at least one security incident and the one or more security incidents that precede the at least one security incident in time;
a data valuation score computed based on structured features associated with the one or more assets of the organization; and
a mutual information score computed based on textual features associated with the at least one security incident and with the one or more assets of the organization.

15. The system of claim 14, wherein the at least one processor is further configured to:
receive feedback from the entity about the ranking of the at least one security incident; and
adjust the ranking of the at least one security incident based on the feedback from the entity.

16. The system of claim 14, wherein the at least one processor is further configured to:

automatically rank the at least one security incident by determining relevance based on a comparison between a representation of information of the one or more assets of the organization and the at least one security incident;

wherein the representation of information of the one or more assets of the organization comprises at least one of:

an organizational network that represents value of each asset of the organization and relationships between assets; and one or more information files that respectively correspond to the one or more assets of the organization.

17. The system of claim 14, wherein the the one or more values attributed to the one or more assets of the organization are computed by one or more valuation algorithms.

18. An article of manufacture comprising a non-transitory processor-readable storage medium having stored therein program code of one or more software programs, wherein the program code when executed by at least one processing device causes the at least one processing device to:

obtain at least one security incident indicative of at least one security event that may impact or has impacted one or more assets associated with an organization;

automatically rank the at least one security incident based on one or more of: (i) one or more rankings associated with one or more security incidents that precede the at least one security incident in time; and (ii) one or more values attributed to the one or more assets of the organization; and present the ranking of the at least one security incident to an entity to make an assessment of the security event; and wherein automatically ranking the at least one security incident further comprises computing a set of scores used to train a ranking model;

wherein the set of scores used to train the ranking model comprises:

a regression score computed based on structured features associated with the one or more security incidents that precede the at least one security incident in time;

a similarity score computed based on textual features associated with the at least one security incident and the one or more security incidents that precede the at least one security incident in time;

a data valuation score computed based on structured features associated with the one or more assets of the organization; and a mutual information score computed based on textual features associated with the at least one security incident and with the one or more assets of the organization.

19. The article of manufacture of claim 18, wherein the program code when executed by at least one processing device causes said at least one processing device to:

receive feedback from the entity about the ranking of the at least one security incident; and adjust the ranking of the at least one security incident based on the feedback from the entity.

20. The article of manufacture of claim 18, wherein the program code when executed by at least one processing device causes said at least one processing device to:

automatically rank the at least one security incident by determining relevance based on a comparison between a representation of information of the one or more assets of the organization and the at least one security incident;

wherein the representation of information of the one or more assets of the organization comprises at least one of:

an organizational network that represents value of each asset of the organization and relationships between assets; and one or more information files that respectively correspond to the one or more assets of the organization.

* * * * *